United States Patent
Cai et al.

(10) Patent No.: US 10,779,283 B2
(45) Date of Patent: Sep. 15, 2020

(54) PHYSICAL RESOURCE SHARING ON WIRELESS INTERFACE

(71) Applicants: Yigang Cai, Naperville, IL (US); Yang Yang, Morris Plains, NJ (US)

(72) Inventors: Yigang Cai, Naperville, IL (US); Yang Yang, Morris Plains, NJ (US)

(73) Assignee: Nokia Technologies Oy, Espoo (FI)

( * ) Notice: Subject to any disclaimer, the term of this patent is extended or adjusted under 35 U.S.C. 154(b) by 189 days.

(21) Appl. No.: 15/168,991

(22) Filed: May 31, 2016

(65) Prior Publication Data

US 2017/0347351 A1    Nov. 30, 2017

(51) Int. Cl.
*H04W 72/04*      (2009.01)
*H04W 4/70*       (2018.01)
(Continued)

(52) U.S. Cl.
CPC ......... *H04W 72/048* (2013.01); *H04L 5/0032* (2013.01); *H04L 5/0044* (2013.01); *H04L 5/0064* (2013.01); *H04L 5/0092* (2013.01); *H04L 47/29* (2013.01); *H04W 4/70* (2018.02); *H04W 28/0268* (2013.01);
(Continued)

(58) Field of Classification Search
CPC ....... H04L 47/12; H04L 47/24; H04L 63/107; H04L 63/108; H04L 63/0227; H04W 4/005; H04W 4/06; H04W 12/08; H04W 28/10; H04W 28/12; H04W 28/0215;
(Continued)

(56) References Cited

U.S. PATENT DOCUMENTS 8,937,916 B2    1/2015  Kim
2013/0227138 A1  8/2013  Cai et al.
(Continued)

FOREIGN PATENT DOCUMENTS

WO    WO2014188342 A1 * 11/2014

OTHER PUBLICATIONS

Media Tek, Inc., "Discussion on PUCCH transmission for Rel-13 MTC," 3GPP Draft: R1-152115, 3GPP TSG-RAN WG1 Meeting #80BIS, Belgrade, RS, Belgrade, Apr. 2015, 4 pages.
(Continued)

*Primary Examiner* — Marsha D Banks Harold
*Assistant Examiner* — Dharmesh J Patel
(74) *Attorney, Agent, or Firm* — Tong, Rea, Bentley & Kim, LLC

(57)    ABSTRACT

The present disclosure generally discloses a wireless resource sharing mechanism configured to support sharing of physical wireless resources of a wireless interface of a wireless access device. The wireless resource sharing mechanism is configured to support sharing of physical wireless resources of a wireless interface of a wireless access device in order to support Machine-Type Communications (MTCs). The wireless resource sharing mechanism is configured to support sharing of physical wireless resources, of a wireless interface of a wireless access device, between MTC traffic of MTC devices and non-MTC traffic of non-MTC devices (referred to herein as legacy traffic of legacy devices). The wireless resource sharing mechanism is configured to support sharing of physical wireless resources, of a wireless interface of a wireless access device, within a scheduling time interval of the wireless interface of the wireless access device.

24 Claims, 5 Drawing Sheets

(51) Int. Cl.
  *H04L 5/00*     (2006.01)
  *H04L 12/801*   (2013.01)
  *H04W 28/02*    (2009.01)
  *H04W 72/12*    (2009.01)
  *H04W 74/08*    (2009.01)

(52) U.S. Cl.
  CPC ... *H04W 72/1263* (2013.01); *H04W 74/0833* (2013.01); *H04L 5/0082* (2013.01); *H04W 72/0446* (2013.01)

(58) Field of Classification Search
  CPC ............. H04W 28/0284; H04W 48/06; H04W 72/0446; H04W 74/0833; H04W 52/0216
  See application file for complete search history.

(56) References Cited

U.S. PATENT DOCUMENTS

| | | |
|---|---|---|
| 2014/0313908 A1* | 10/2014 | da Silva et al. |
| 2015/0341953 A1 | 11/2015 | Xia et al. |
| 2016/0100395 A1 | 4/2016 | Xu et al. |
| 2016/0242229 A1* | 8/2016 | Balachandran ......... H04W 4/70 |
| 2016/0270116 A1* | 9/2016 | Lin ................... H04W 72/1289 |

OTHER PUBLICATIONS

International Search Report and Written Opinion of corresponding PCT/EP2017/062520 dated Dec. 7, 2017, 12 pages.

\* cited by examiner

FIG. 2

RESOURCE SHARING BITMAP
200

| BIT LOCATION | MEANING |
|---|---|
| 0 (DL) | 0: NO SIB IN STW, 1: YES THERE'S SIB IN STW |
| 1-4 (DL) | EACH BIT LOCATION $n\_s=1$ MEANS THAT TTI N HAS SIB ON S-PDSCH |
| 5 (DL) | 0: NO PAGING IN THE STW<br>1: YES THERE'S PAGING ON SUB-FRAME #9 IN THE TTI ON P-PDCCH AND SUB-FRAME #X ON P-PDSCH DEPENDING ON CELL-LEVEL MTC CONFIGURATION. |
| 6 (DL) | 0: NO RAR IN THE STW.<br>1: YES THERE'S RAR ON TTI #A TO B ON M-PDCCH AND SUB-FRAME #A-D ON M-PDSCH DEPENDING ON SYSTEM CONFIGURATION. |
| 7-14 (DL) | EACH BIT LOCATION $n\_c=1$ MEANS THE TTI MOD 8 = $n\_c$ HAS M-PDCCH. |
| 15-22 (DL) | EACH BIT LOCATION $n\_d=1$ MEANS THE TTI MOD 8 = $n\_d$ HAS M-PDSCH. |
| 23-30 (UL) | EACH BIT LOCATION $n\_u=1$ MEANS THE TTI MOD 8 = $n\_u$ HAS M-PUSCH. (THIS INCLUDES MSG3 - IF LATER MSG3 SUPPORTS HARQ) |

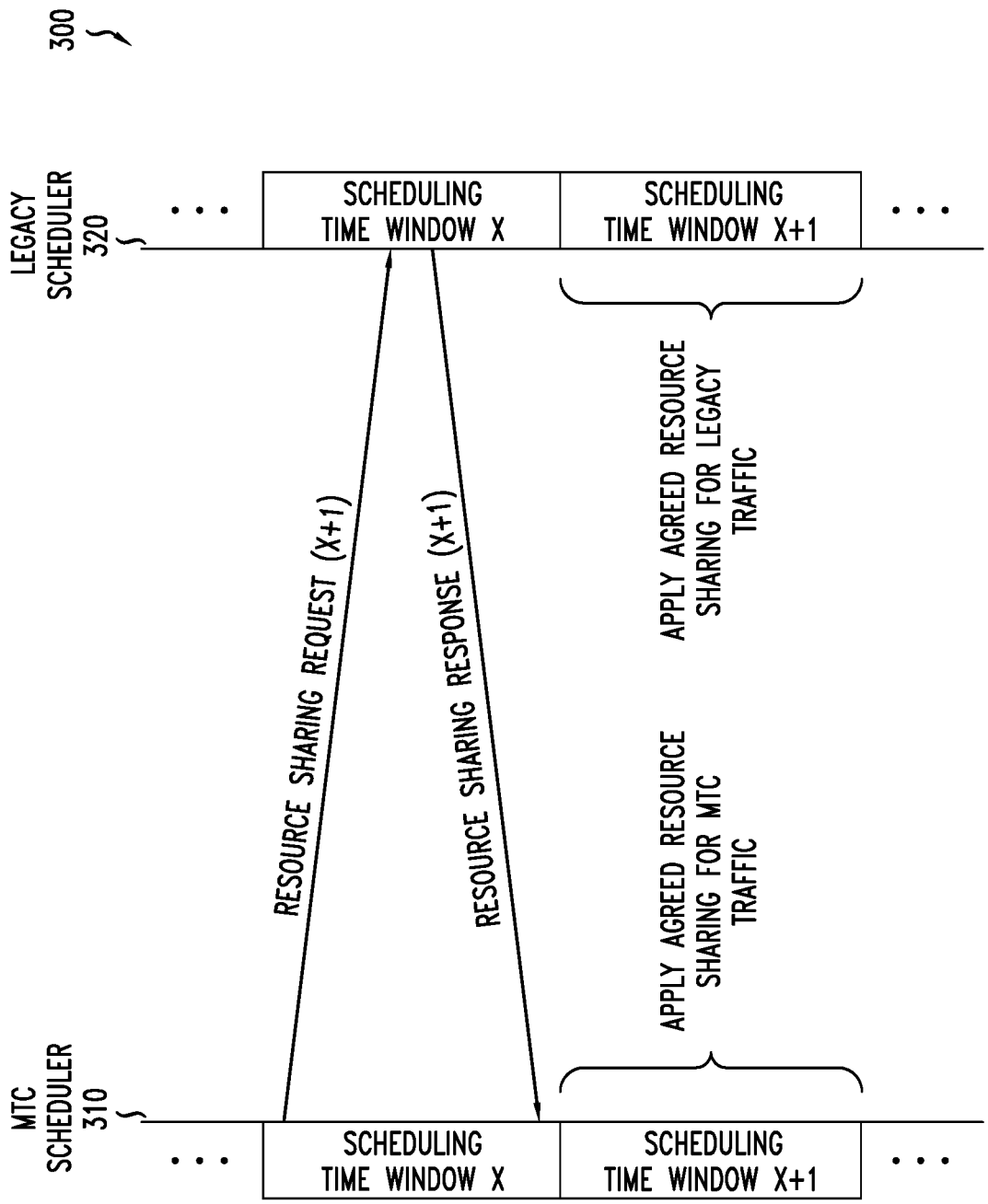

PHYSICAL RESOURCE SHARING ON WIRELESS INTERFACE

TECHNICAL FIELD

The present disclosure relates generally to the field of communication networks and, more particularly but not exclusively, to sharing of physical resource of a wireless interface.

BACKGROUND

Many types of wireless communication networks support wireless access devices having wireless interfaces which may be configured to support communications by various types of wireless devices.

SUMMARY

The present disclosure generally discloses support for sharing of physical wireless resources of a wireless interface for use by machine-type communication (MTC) traffic and legacy traffic.

In at least some embodiments, an apparatus is provided. The apparatus includes a processor and a memory communicatively connected to the processor. The processor is configured to determine, for a target scheduling time interval on a wireless interface, a resource sharing indicative of sharing of physical wireless resources of the target scheduling time interval between MTC traffic and legacy traffic. The processor is configured to perform scheduling for the target scheduling time interval based on the resource sharing indicative of sharing of the physical wireless resources of the target scheduling time interval between MTC traffic and legacy traffic.

In at least some embodiments, a non-transitory computer-readable storage medium is provided. The non-transitory computer-readable storage medium stores instructions which, when executed by a computer, cause the computer to perform a method. The method includes determining, for a target scheduling time interval on a wireless interface, a resource sharing indicative of sharing of physical wireless resources of the target scheduling time interval between MTC traffic and legacy traffic. The method includes performing scheduling for the target scheduling time interval based on the resource sharing indicative of sharing of the physical wireless resources of the target scheduling time interval between MTC traffic and legacy traffic.

In at least some embodiments, a method is provided. The method includes determining, for a target scheduling time interval on a wireless interface, a resource sharing indicative of sharing of physical wireless resources of the target scheduling time interval between MTC traffic and legacy traffic. The method includes performing scheduling for the target scheduling time interval based on the resource sharing indicative of sharing of the physical wireless resources of the target scheduling time interval between MTC traffic and legacy traffic.

BRIEF DESCRIPTION OF THE DRAWINGS

The teachings herein can be readily understood by considering the following detailed description in conjunction with the accompanying drawings, in which:

FIG. 2 depicts an exemplary resource sharing bitmap representing sharing of physical wireless resources of a wireless interface between MTC traffic and legacy traffic;

FIG. 3 depicts an exemplary message flow between an MTC scheduler and a legacy scheduler for determining an agreed resource sharing;

To facilitate understanding, identical reference numerals have been used, where possible, to designate identical elements that are common to the figures.

DETAILED DESCRIPTION

The present disclosure generally discloses a wireless resource sharing mechanism. The wireless resource sharing mechanism is configured to support sharing of physical wireless resources of a wireless interface (or air interface or radio link) of a wireless access device. The wireless resource sharing mechanism is configured to support sharing of physical wireless resources of a wireless interface of a wireless access device in order to support Machine-Type Communications (MTCs). The wireless resource sharing mechanism is configured to support sharing of physical wireless resources, of a wireless interface of a wireless access device, between MTC traffic of MTC devices and non-MTC traffic of non-MTC devices (which is referred to herein as legacy traffic of legacy devices). The wireless resource sharing mechanism is configured to support sharing of physical wireless resources, of a wireless interface of a wireless access device, within a scheduling time interval of the wireless interface of the wireless access device. The wireless resource sharing mechanism is configured to support sharing of physical wireless resources, of a wireless interface of a wireless access device, within a scheduling time interval which represents the smallest unit of time within which a scheduler of the wireless access device may determine scheduling of transmissions via the wireless interface. The sharing of physical wireless resources of a wireless interface of a wireless access device, between MTC traffic of MTC devices and legacy traffic of legacy devices, may improve wireless resource usage and performance. These and various other embodiments and potential advantages of the wireless resource sharing mechanism may be further understood by way of reference to the exemplary communication network of FIG. 1.

Figure 1:
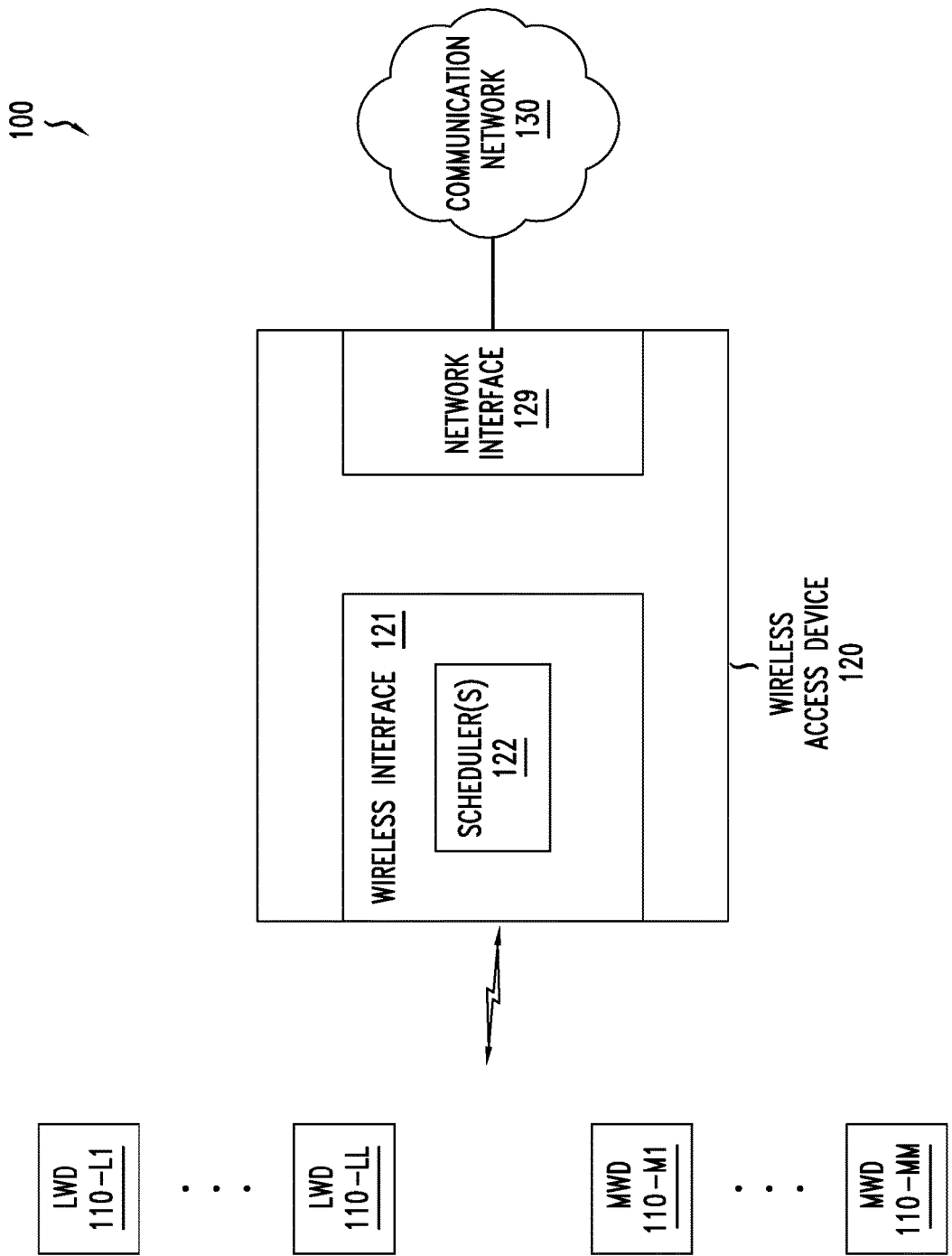
FIG. 1 depicts an exemplary communication network including a wireless access device including a wireless interface where the wireless access device is configured to support sharing of physical wireless resources of the wireless interface.

FIG. 1 depicts an exemplary communication network including a wireless access device including a wireless interface where the wireless access device is configured to support sharing of physical wireless resources of the wireless interface.

The communication network 100 includes a set of wireless devices (WDs) 110, a wireless access device (WAD) 120 configured to operate as a wireless point of access for the WDs 110, and a communication network (CN) 130 configured to support communications of the WDs 110.

The WDs 110 include a set of legacy WDs (LWDs) 110-L1-110-LL (collectively, LWDs 110-L) and a set of MTC-based WDs (MWDs) 110-M1-110-MM (collectively, MWDs 110-M).

The LWDs 110-L may include any wireless devices not classified as MWDs. For example, the LWDs 110-L may include end user devices such as laptop computers, tablet computers, smartphones, or the like. The LWDs 110-L are configured to communicate via WAD 120. The LWDs 110-L may be configured to send and receive various types of traffic referred to herein as legacy traffic. For example, legacy traffic which may be sent or received by LWDs 110-L may include audio (e.g., voice), video, multimedia, data, or the like, as well as various combinations thereof.

The MWDs 110-M may include any MTC configured for wireless communication. For example, the MWDs 110-M may include Internet-of-Things (IoT) devices or other types of devices configured for machine-to-machine (M2M) communications. For example, the MWDs 110-M may include enhanced MTC (eMTC) devices, which also may be referred to as Category-M (Cat-M) devices. The MWDs 110-M may be configured to send and receive various types of traffic referred to herein as MTC traffic. For example, MTC traffic which may be sent or received by MWDs 110-M typically may include data (e.g., sensor readings, temperature readings, control signals for controlling actuators, or the like), but also may include other types of traffic such as audio, video, multimedia, or the like, as well as various combinations thereof.

The WAD 120 is configured to operate as a wireless point of access for WDs 110. The WAD 120 is configured to support communications of the WDs 110. The WAD 120 may be configured for use within a Fourth Generation (4G) wireless system (e.g., a Long Term Evolution (LTE) wireless system), a Fifth Generation (5G) wireless system, or the like. The WAD 120 is configured to support a combination of MTC traffic of the MWDs 110-M and legacy traffic of the LWDs 110-L. The support for a combination of MTC traffic of the MWDs 110-M and legacy traffic of the LWDs 110-L may be based on one or more of LTE Machine-to-Machine (LTE-M), LTE enhanced MTC (eMTC), Narrowband LTE (NB-LTE), Enhanced Coverage LTE (EC-LTE), a next-gen capability (e.g., 5G MTC), or the like. For example, within a 4G LTE wireless system, WAD 120 may be an evolved NodeB (eNodeB). For example, within a 5G wireless system, WAD 120 may be an eNodeB. For example, WAD 120 may be a picocell device, a femtocell device, or the like. The WAD 120 may be any other suitable type of wireless access device.

The WAD 120 is configured to support communications of the WDs 110. The WAD 120 includes a wireless interface 121 that is configured to support wireless communications of the WDs 110. The wireless interface 121 is configured to support wireless communications of WDs 110 using a set of physical wireless resources supported by the wireless interface 121. The wireless interface 121 is configured to determine scheduling of MTC traffic of MWDs 110-M and legacy traffic of LWDs 110-L via the physical wireless resources of the wireless interface 121, as discussed is further detail below. The WAD 120 includes a network interface 129 that is configured to support communications of the WDs 110 that are upstream of the WAD 120 (e.g., communications between the WAD 120 and the CN 130 and, thus, with the various networks and devices accessible via CN 130).

The CN 130 is a communication network configured to support communications associated with WAD 120 and, thus, which is configured to support communications of the WDs 110. The CN 130 may include a core wireless network supporting WAD 120. For example, within a 4G LTE wireless system, CN 130 may be an evolved packet core (EPC) network. For example, within a 5G wireless system, CN 130 may be 5G core wireless network. The CN 130 also may be considered to include various packet data networks which may be accessible via the core wireless network (e.g., a public data network such as the Internet, a private data network such as a datacenter network or enterprise network, or the like, as well as various combinations thereof). The CN 130, although omitted for purposes of clarity, may include various devices configured to provide various data plane and control plane functions.

The WAD 120, as discussed further below, is configured to determine scheduling of transmission of MTC traffic of the MWDs 110-M and legacy traffic of the LWDs 110-L via physical wireless resources of the wireless interface 121. The scheduling of the transmission of MTC traffic of the MWDs 110-M and legacy traffic of the LWDs 110-L via physical wireless resources of the wireless interface 121 may include sharing of the physical wireless resources of the wireless interface 121 between the MTC traffic of the MWDs 110-M and the legacy traffic of the LWDs 110-L (and, thus, between the MWDs 110-M and the LWDs 110-L). The operation of the wireless interface 121 (and, more specifically, one or more scheduler(s) of the wireless interface 121) in determining scheduling of transmission of MTC traffic of MWDs 110-M and legacy traffic of LWDs 110-L via the physical wireless resources of the wireless interface 121 is described further below.

The wireless interface 121 is configured to support communications of the WDs 110 using a set of physical wireless resources. The set of physical wireless resources on the wireless interface 121 may be used to provide a downlink (DL) channel configured to support wireless transmissions to WDs 110 and an uplink (UL) channel configured to support wireless transmissions by WDs 110. The set of physical wireless resources of wireless interface 121 may configured in various ways and the scheduling of transmissions using the set of physical wireless resources of wireless interface 121 may configured in various ways, which may depend on wireless system type (e.g., LTE, 5G, or the like) or other factors. For example, within a 4G LTE network, the set of physical wireless resources on the wireless interface 121 may be defined as follows: one frame is 10 ms and contains 10 sub-frames, one sub-frame is 1 ms and contains 2 time slots, one time slot is 0.5 ms and contains a set of resource elements which make up a physical resource block (PRB), and a PRB of a time slot contains 12 subcarriers for each OFDM symbol in the frequency domain where there may be 7 symbols per time slot in the time domain (normal cyclic prefix) for a total of 84 carrier symbols or 6 symbols per time slot (long cyclic prefix) for a total of 72 carrier symbols. The PRB is the smallest assignable unit of physical wireless resources. In general, the LTE scheduler is configured to allocated PRBs within an interval of time referred to as the Transmission Time Interval (TTI), which is the smallest unit of time within which the LTE scheduler may schedule transmissions using PRBs. It will be appreciated that, within other types of wireless systems (e.g., 5G or the like), the set of physical wireless resources of wireless interface 121 may be configured in other ways and the scheduling of transmissions using the set of physical wireless resources of wireless interface 121 may configured in other ways. Generally speaking, however, the set of physical wireless resources of the wireless interface 121 is expected to support a smallest assignable unit of physical wireless resources (which may be referred to herein as a PRB or, more generally, as a physical wireless resource block) and a smallest unit of time within which the scheduler may schedule transmissions using physical wireless resource blocks. The unit of time interval within which the scheduler may schedule transmissions using physical wireless resource blocks may be referred to herein as a TTI or, more generally, as a scheduling time interval (STI).

The wireless interface 121 includes a scheduler(s) 122 configured to determine scheduling of transmissions via the physical wireless resources of the wireless interface 121. The scheduler(s) 122 is configured to determine scheduling of transmission of MTC traffic of the MWDs 110-M and legacy traffic of the LWDs 110-L via the physical wireless resources of the wireless interface 121. The scheduler(s) 122 is configured to determine scheduling of transmission of MTC traffic of the MWDs 110-M and legacy traffic of the LWDs 110-L via the physical wireless resources of the wireless interface 121 by determining sharing of the physical wireless resources of the wireless interface 121 between the MTC traffic of the MWDs 110-M and the legacy traffic of the LWDs 110-L.

The scheduler(s) 122 may be configured to determine scheduling of transmission of MTC traffic of the MWDs 110-M and legacy traffic of the LWDs 110-L via the physical wireless resources of the wireless interface 121 by determining sharing of the physical wireless resources of the wireless interface 121 between the MTC traffic of the MWDs 110-M and the legacy traffic of the LWDs 110-L within an STI. In general, an STI is a smallest length of time for which the scheduler(s) 122 may execute a scheduling process in order to determine scheduling of transmissions via wireless interface 121 (e.g., a TTI in 4G LTE). The sharing of the physical wireless resources of the wireless interface 121 between the MTC traffic of the MWDs 110-M and the legacy traffic of the LWDs 110-L within an STI may include a time domain resource sharing, a frequency domain resource sharing, or a time and frequency domain resource sharing. For example, within a 4G LTE network, the sharing of the physical wireless resources of the wireless interface 121 between the MTC traffic of the MWDs 110-M and the legacy traffic of the LWDs 110-L within a TTI may include sharing one or more sub-frames, sharing one or more sub-carriers, or the like, as well as various combinations thereof. For example, within a 4G LTE network, the sharing of the physical wireless resources of the wireless interface 121 between the MTC traffic of the MWDs 110-M and the legacy traffic of the LWDs 110-L within a TTI may include assigning the MTC traffic of the MWDs 110-M and the legacy traffic of the LWDs 110-L to various PRBs in ways that enable sharing of time and/or frequency resources of the TTI. It will be appreciated that other types of resource sharing may be supported.

The scheduler(s) 122 may be configured to determine scheduling of transmission of MTC traffic of the MWDs 110-M and legacy traffic of the LWDs 110-L via the physical wireless resources of the wireless interface 121 by operating using a scheduling time window (STW). In general, an STW is the window of time for which the scheduler(s) 122 execute a scheduling process in order to determine scheduling of transmissions via wireless interface 121 (e.g., a TTI in 4G LTE). The STW may include one or more STIs. For example, in a 4G LTE network, an STW may be composed of one or more TTIs (e.g., 1 TTI, 2 TTIs, 4 TTIs, or the like). The scheduler(s) 122 may be configured to determine scheduling of transmission of MTC traffic of the MWDs 110-M and legacy traffic of the LWDs 110-L via the physical wireless resources of the wireless interface 121 by operating using a scheduling time window (STW) composed of multiple STIs by applying the same resource sharing in each of the multiple STIs or by applying different resource sharing in different ones of the multiple STIs. It will be appreciated that, where the STW is composed of multiple STIs, the physical wireless resources of the wireless interface 121 may be shared between the MTC traffic of the MWDs 110-M and the legacy traffic of the LWDs 110-L within each of the STIs of which the STW is composed. Accordingly, for purposes of clarity, operation of the scheduler(s) 122 in determining scheduling of transmission of MTC traffic of the MWDs 110-M and legacy traffic of the LWDs 110-L via the physical wireless resources of the wireless interface 121 based on sharing of resources is primarily depicted and described herein within the context of embodiments in which the STW is composed of a single STI (in order to further illustrate the manner in which the physical wireless resources of the wireless interface 121 may be shared between the MTC traffic of the MWDs 110-M and the legacy traffic of the LWDs 110-L within a particular STI). It will be appreciated that STW size may be different in different implementations and, further, that the STW size may be configurable and may be changed dynamically over time.

The scheduler(s) 122 may be configured to determine whether or not to apply resource sharing for a particular STI. The scheduler(s) 122 may be configured to determine whether or not to apply resource sharing for a particular STI by making the determination locally at the scheduler(s) 122, based on an indication from an element of the WAD 120 (which may be determined by that element of WAD 120 or received by that element of WAD 120 from a remote element or device), or the like. In general, it is noted that, when resource sharing is activated for a particular STI then the physical wireless resources of the particular STI may be shared between MTC traffic of the MWDs 110-M and the legacy traffic of the LWDs 110-L, whereas when resource sharing is deactivated for a particular STI then the physical wireless resources of the particular STI are either dedicated to MTC traffic of MWDs 110-M or dedicated to legacy traffic of LWDs 110-L. The scheduler(s) 122 may be configured to determine whether or not to apply resource sharing for a particular STI in advance of the particular STI (e.g., x STIs before the particular STI, where x may be equal to one (i.e., the immediately preceding STI) or may be greater than one). The activation and deactivation of resource sharing may be performed on a per STI basis (although it will be appreciated that the scheduler(s) 122 may remain in a particular resource sharing mode over multiple STIs until that resource sharing mode is changed (e.g., changed from deactivated to activated or changed from activated to deactivated).

The scheduler(s) 122 may be configured to determine resource sharing for a particular STI and to apply, in the particular STI, the resource sharing determined for the particular STI. The scheduler(s) 122 may be configured to determine the resource sharing to be applied in a particular STI in advance of the particular STI (e.g., x STIs before the particular STI, where x may be equal to one (i.e., the STI that immediately precedes the STI) or may be greater than one). The resource sharing for an STI specifies use of the physical wireless resources of the wireless interface 121 during the STI, specifying the sharing of the physical wireless resources of the wireless interface 121 between the MTC traffic of the MWDs 110-M and the legacy traffic of the LWDs 110-L during the STI. The resource sharing for an STI may specify the sharing of the physical wireless resources of the wireless interface 121 between the MTC traffic of the MWDs 110-M and the legacy traffic of the LWDs 110-L by specifying, for each wireless resource block of the STI, whether that wireless resource block of the STI is to be used to transport MTC traffic of the MWDs 110-M or legacy traffic of the LWDs 110-L. The resource sharing for an STI may specify the sharing of the physical wireless resources of the wireless interface 121 between the MTC traffic of the MWDs 110-M and the legacy traffic of the LWDs 110-L by specifying, for each wireless resource block of the STI, the specific MTC traffic (e.g., MTC traffic type or on a per MWDs 110-M basis) or legacy traffic (e.g., legacy traffic type or on a per LWDs 110-L basis) that will be transported using that wireless resource block of the STI. The resource sharing may be bandwidth independent. It will be appreciated that the wireless resource sharing may be specified at other granularities (e.g., per sub-frame, per sub-carrier, or the like, as well as various combinations thereof) which may depend on the manner in which the physical wireless resources are being shared (e.g., a time domain representation, a frequency domain representation, or a time and frequency domain representation), may be represented using various types of data structures, or the like, as well as various combinations thereof.

The scheduler(s) 122, as discussed hereinabove, may include a single scheduler 122 that is configured to control sharing of physical wireless resources of wireless interface 121 between MTC traffic and legacy traffic or may include multiple schedulers 122 (e.g., an MTC scheduler and a legacy scheduler) which may cooperate to control sharing of physical wireless resources of wireless interface 121 between MTC traffic and legacy traffic. These embodiments are discussed in further detail below.

In an embodiment in which the scheduler(s) 122 is a single scheduler for MTC traffic and legacy traffic, the scheduler 122 may determine the resource sharing for the MTC traffic and the legacy traffic. The scheduler 122 may determine the resource sharing for the MTC traffic and the legacy traffic based on various types of information. The scheduler 122 may determine the resource sharing for the MTC traffic and the legacy traffic based on MTC information (e.g., which may be available to the MTC scheduler in a dual scheduler implementation) and legacy information (e.g., which may be available to the legacy scheduler in a dual scheduler implementation).

The scheduler 122 may determine the resource sharing for the MTC traffic and the legacy traffic, for sharing of the sharing of physical wireless resources of wireless interface 121 within a target STI, based on various types of MTC information. For example, the scheduler 122 may determine the resource sharing for the MTC traffic and the legacy traffic based on measurement of resource utilization of the physical wireless resources of the wireless interface 121 (e.g., NB utilization, PRB utilization, or the like, which may depend on the manner in which the physical wireless resources are defined and utilized on wireless interface 121). For example, the scheduler 122 may determine the resource sharing for the MTC traffic and the legacy traffic based on MTC traffic overhead, MTC traffic signaling, MTC traffic utilization reports, or the like, as well as various combinations thereof. For example, the scheduler 122 may determine the resource sharing for the MTC traffic and the legacy traffic based on the Cat-M transmission waiting list and its priority order. For example, the scheduler 122 may determine the resource sharing for the MTC traffic and the legacy traffic based on whether or not there is a scheduled Cat-M SI transmission in the STI. For example, the scheduler 122 may determine the resource sharing for the MTC traffic and the legacy traffic based on whether or not a page arrived that needs to be sent in the target STI. For example, the scheduler 122 may determine the resource sharing for the MTC traffic and the legacy traffic based on whether or not a Random Access Channel (RACH) has been detected that needs to be responded to in the target STI. For example, the scheduler 122 may determine the resource sharing for the MTC traffic and the legacy traffic based on traffic activity of one or more previous STIs (e.g., in a period of [currentWindowStart-x, nextWindowStarts-x] STIs). It will be appreciated that traffic activity may be indicated by the arrival of DL unicast data (e.g., data or signaling) or UL buffer occupancy (BO) presence. The scheduler 122 may determine the resource sharing for the MTC traffic and the legacy traffic within the target STI based on various other types of MTC information.

The scheduler 122 may determine the resource sharing for the MTC traffic and the legacy traffic, for sharing of the sharing of physical wireless resources of wireless interface 121 within a target STI, based on various types of legacy information. For example, the scheduler 122 may determine the resource sharing for the MTC traffic and the legacy traffic based on indications of the traffic mix for legacy traffic supported by WAD 120 (e.g., legacy data traffic versus legacy voice traffic), quality-of-service (QoS) information for the legacy traffic supported by WAD 120, or the like, as well as various combinations thereof. The scheduler 122 may determine the resource sharing for the MTC traffic and the legacy traffic within the target STI based on various other types of legacy information.

The scheduler 122 may represent the resource sharing for the MTC traffic and the legacy traffic using any suitable resource sharing representation (e.g., using one or more data structures). The scheduler 122 may represent the resource sharing for the MTC traffic and the legacy traffic using a resource sharing bitmap. The resource sharing bitmap may be a time domain resource sharing bitmap (e.g., where the sharing of the physical wireless resources is in the time domain), a frequency domain resource sharing bitmap (e.g., where the sharing of the physical wireless resources is in the frequency domain), or a time and frequency domain resource sharing bitmap (e.g., where the sharing of the physical wireless resources is in the time domain and the frequency domain). An exemplary time domain resource sharing bitmap representing sharing of physical wireless resources of wireless interface 121 between MTC traffic and legacy traffic for a given target STI is depicted and described with respect to FIG. 2.

The scheduler 122 may apply the determined resource sharing, determined for a target STI, for controlling sharing of resources by the MTC traffic and the legacy traffic in the target STI. The DL/UL resources that are assigned for MTC traffic in the target STI are not available to legacy traffic in the target STI and, similarly, the DL/UL resources that are assigned for legacy traffic in the target STI are not available to MTC traffic in the target STI.

In an embodiment in which the scheduler(s) 122 includes an MTC scheduler for scheduling MTC traffic and a legacy scheduler for scheduling legacy traffic, the MTC scheduler and the legacy scheduler may communicate in order to determine resource sharing for the MTC traffic and the legacy traffic. The communication between the MTC scheduler and the legacy scheduler may be performed using a communication interface between the MTC scheduler and the legacy scheduler (e.g., direct physical connection, a communication path, or the like, as well as various combinations thereof). The communication between the MTC scheduler and the legacy scheduler may include a single exchange of resource sharing messages (e.g., a simple request/response transaction) or multiple exchanges of resource sharing messages (e.g., where the MTC scheduler and the legacy scheduler may exchange messages over multiple rounds in order to negotiate and agree to resource sharing for the MTC traffic and the legacy traffic).

In at least some embodiments, as discussed above, communication between the MTC scheduler and the legacy scheduler for determining resource sharing may include a single exchange of resource sharing messages between the MTC scheduler and the legacy scheduler. The MTC scheduler may determine a proposed resource sharing and send the proposed resource sharing (or an indication thereof) to the legacy scheduler in a resource sharing request. The proposed resource sharing may be indicative of the physical wireless resources needed by or requested by the MTC scheduler. The proposed resource sharing may be represented using any suitable resource sharing representation (e.g., using a proposed resource sharing bitmap similar to the resource sharing bitmap depicted in FIG. 2). The legacy scheduler may receive the resource sharing request including the proposed resource sharing, determine an agreed resource sharing based on the proposed resource sharing, and send the agreed resource sharing (or an indication thereof) to the MTC scheduler in a resource sharing response. The agreed resource sharing may then be applied by the MTC scheduler (e.g., the MTC scheduler applies the determined resource sharing to MTC traffic) and applied by the legacy scheduler (e.g., the legacy scheduler applies the determined resource sharing to the legacy traffic). An exemplary embodiment of a message flow between an MTC scheduler and a legacy scheduler, using a single exchange of resource sharing messages, for determining an agreed resource sharing is presented with respect to FIG. 3.

The MTC scheduler may determine the proposed resource sharing based on various types of MTC information. For example, the MTC scheduler may determine the proposed resource sharing for the MTC traffic and the legacy traffic based on measurement of resource utilization of the physical wireless resources of the wireless interface 121 (e.g., NB utilization, PRB utilization, or the like, which may depend on the manner in which the physical wireless resources are defined and utilized on wireless interface 121). For example, MTC scheduler may determine the proposed resource sharing for the MTC traffic and the legacy traffic based on MTC traffic overhead, MTC traffic signaling, MTC traffic utilization reports, or the like, as well as various combinations thereof. For example, the MTC scheduler may determine the proposed resource sharing for the MTC traffic and the legacy traffic based on the Cat-M transmission waiting list and its priority order. For example, the MTC scheduler may determine the proposed resource sharing for the MTC traffic and the legacy traffic based on whether or not there is a scheduled Cat-M SI transmission in the STI. For example, the MTC scheduler may determine the proposed resource sharing for the MTC traffic and the legacy traffic based on whether or not a page arrived that needs to be sent in the target STI. For example, the MTC scheduler may determine the proposed resource sharing for the MTC traffic and the legacy traffic based on whether or not a RACH has been detected that needs to be responded to in the target STI. For example, the MTC scheduler may determine the proposed resource sharing for the MTC traffic and the legacy traffic based on traffic activity of one or more previous STIs (e.g., in a period of [currentWindowStart-x, nextWindowStarts-x] STIs). It will be appreciated that traffic activity may be indicated by the arrival of DL unicast data (e.g., data or signaling) or UL BO presence. The MTC scheduler may determine the proposed resource sharing for the MTC traffic and the legacy traffic within the target STI based on various other types of MTC information.

The MTC scheduler may determine the proposed resource sharing for the MTC traffic and the legacy traffic based on various types of legacy information. For example, the MTC scheduler may determine the proposed resource sharing for the MTC traffic and the legacy traffic based on indications of the traffic mix for legacy traffic supported by WAD 120 (e.g., legacy data traffic versus legacy voice traffic), quality-of-service (QoS) information for the legacy traffic supported by WAD 120, or the like, as well as various combinations thereof. The MTC scheduler may obtain the legacy information from the legacy scheduler. The MTC scheduler may determine the proposed resource sharing for the MTC traffic and the legacy traffic based on various other types of legacy information.

The legacy scheduler may determine the agreed resource sharing by simply determining whether or not to accept the proposed resource sharing indicated in the resource sharing request received from the MTC scheduler without determining whether to modify the proposed resource sharing to produce the agreed resource sharing. This may be used where the legacy scheduler is not capable of modifying the proposed resource sharing or where the legacy scheduler is not permitted to modify the proposed resource sharing. This may simply be a grant or deny determination in which the legacy scheduler decides to grant the proposed resource sharing proposed by the MTC scheduler in the resource sharing request or decides to deny the proposed resource sharing proposed by the MTC scheduler in the resource sharing request. In this case, if the legacy scheduler grants the proposed resource sharing then the proposed resource sharing becomes the agreed resource sharing, whereas if the legacy scheduler denies the proposed resource sharing then the agreed resource sharing may be an agreement that a previously agreed resource sharing will be used or an agreement that resource sharing will not be used. The legacy scheduler may be configured to always grant the proposed resource sharing. The legacy scheduler may indicate the grant or deny decision to the MTC scheduler in any suitable manner. For example, the resource sharing response may simply include a flag or other suitable indicator set in a manner for indicating whether or not the legacy scheduler is granting the proposed resource sharing indicated in the resource sharing request received from the MTC scheduler (e.g., flag set to ON, 1, or any other suitable value) or denying the proposed resource sharing indicated in the resource sharing request received from the MTC scheduler (e.g., flag set to OFF, 0, or any other suitable value). For example, where the resource sharing response is to indicate a decision by the legacy scheduler to grant the proposed resource sharing, the resource sharing response may include the proposed resource sharing included in the resource sharing request received from the MTC scheduler (e.g., the proposed resource sharing bitmap from the resource sharing request is sent back to the MTC scheduler as an agreed resource sharing bitmap).

The legacy scheduler may determine the agreed resource sharing by determining whether or not to accept the proposed resource sharing indicated in the resource sharing request received from the MTC scheduler while also determining whether to modify the proposed resource sharing to produce the agreed resource sharing. This may be used where the legacy scheduler is capable of modifying the proposed resource sharing and is permitted to modify the proposed resource sharing. The legacy scheduler may be configured to always grant the proposed resource sharing.

The legacy scheduler may be configured to always grant the proposed resource sharing with the exception of UL PUSCH HARQ collision avoidance (for which the legacy scheduler may modify the proposed resource sharing such that the agreed resource sharing does not include resources for UL PUSCH HARQ collision avoidance in order to avoid HARQ collisions). The legacy scheduler may determine whether to modify the proposed resource sharing to produce the agreed resource sharing as part of the determination as to whether or not to accept the proposed resource sharing indicated in the resource sharing request received from the MTC scheduler or after the determination to accept the proposed resource sharing indicated in the resource sharing request received from the MTC scheduler. The legacy scheduler may determine whether to modify the proposed resource sharing to produce the agreed resource sharing based on legacy information available to the legacy scheduler (e.g., based on indications of the traffic mix for legacy traffic supported by WAD 120 (e.g., legacy data traffic versus legacy voice traffic), quality-of-service (QoS) information for the legacy traffic supported by WAD 120, or the like, as well as various combinations thereof). In this case, if the legacy scheduler grants the proposed resource sharing without modifying the proposed resource sharing then the proposed resource sharing becomes the agreed resource sharing, if the legacy scheduler grants the proposed resource sharing while also modifying the proposed resource sharing then the modified proposed resource sharing becomes the agreed resource sharing, and if the legacy scheduler denies the proposed resource sharing then the agreed resource sharing is simply an agreement that resource sharing will not be used. The legacy scheduler may indicate the grant or deny decision to the MTC scheduler in any suitable manner. For example, if the legacy scheduler grants the proposed resource sharing without modifying the proposed resource sharing, the resource sharing response may simply include a flag or other suitable indicator set in a manner for indicating that the legacy scheduler is granting the proposed resource sharing indicated in the resource sharing request received from the MTC scheduler as the agreed resource sharing (e.g., flag set to ON, 1, or any other suitable value) or may include a representation of the proposed resource sharing included in the resource sharing request received from the MTC scheduler as the agreed resource sharing (e.g., an agreed resource sharing bitmap similar to the resource sharing bitmap depicted in FIG. 2). For example, if the legacy scheduler grants the proposed resource sharing while also modifying the proposed resource sharing, the resource sharing response may include a representation of the agreed resource sharing (e.g., using an agreed resource sharing bitmap similar to the resource sharing bitmap depicted in FIG. 2). For example, if the legacy scheduler denies the proposed resource sharing, the resource sharing response may simply include a flag or other suitable indicator set in a manner for indicating that the legacy scheduler is denying the proposed resource sharing indicated in the resource sharing request received from the MTC scheduler (e.g., flag set to OFF, 0, or any other suitable value).

In at least some embodiments, as discussed above, communication between the MTC scheduler and the legacy scheduler for determining resource sharing may include multiple exchanges of resource sharing messages (e.g., where the MTC scheduler and the legacy scheduler may exchange messages over multiple rounds in order to negotiate and agree to resource sharing for the MTC traffic and the legacy traffic). The negotiation between the MTC scheduler and the legacy scheduler may include exchanging of messages including various types of information (e.g., MTC information, legacy information, or the like), flags or other indicators, resource sharing bitmaps, or the like, as well as various combinations thereof. The negotiation between the MTC scheduler and the legacy scheduler may result in determination of an agreed resource sharing (which may be represented as an agreed resource sharing bitmap similar to the resource sharing bitmap depicted in FIG. 2) that may be configured to benefit both MTC throughout for MTC traffic and legacy throughput for legacy traffic.

The MTC scheduler and the legacy scheduler each may apply the agreed resource sharing for controlling sharing of resources by the MTC traffic and the legacy traffic. It is noted that, where the MTC scheduler and legacy scheduler agree on an agreed resource sharing for a target STI, (1) the DL/UL resources that are assigned for MTC traffic in the target STI may be used by the MTC scheduler for MTC traffic and may not be used by the legacy scheduler for legacy traffic and (2) the remaining DL/UL resources of the target STI, which may include any resources not specified in the agreed resource sharing as being for MTC traffic, may be used by the legacy scheduler for legacy traffic. It is noted that, where the MTC scheduler and legacy scheduler cannot agree on an agreed resource sharing for a target STI (e.g., the legacy scheduler denies the resource sharing request from the MTC scheduler without engaging in negotiation with the MTC scheduler, the legacy scheduler engages in negotiation with the MTC scheduler but the negotiation does not result in an agreed resource sharing, or like situations in which the MTC scheduler is not granted access to shared resources), (1) the MTC scheduler may not use any DL/UL resources (with the exception of SIB1-bis for MTC traffic) in the target STI and (2) the legacy scheduler may use all available DL/UL resources in the target STI for legacy traffic.

In at least some embodiments, the MTC scheduler may receive an invalid resource sharing response from the legacy scheduler or may not receive any resource sharing response (or at least not before the start of the target STI for which resource sharing is being negotiated) from the legacy scheduler. In at least some such embodiments, the MTC scheduler may apply resource sharing using a previously agreed resource sharing (e.g., the most recently agreed resource sharing bitmap, a default resource sharing bitmap agreed upon by the MTC scheduler and the legacy scheduler for events such as these, or the like). In at least some such embodiments, resource sharing may be deactivated for the target STI.

As previously discussed, use of resource sharing by scheduler(s) 122 may be dynamically controlled by WAD 120.

The WAD 120 may be configured to dynamically control whether or not resource sharing is used.

The WAD 120 may be configured to dynamically control use of resource sharing by dynamically determining whether or not resource sharing is to be used and then dynamically activating (or applying) or deactivating (or not applying) resource sharing based on the dynamic determination as to whether or not resource sharing is to be used. For example, the WAD 120 may be configured to dynamically determine, in advance of a target STI, whether or not resource sharing is to be used during the target STI and then dynamically activate or deactivate resource sharing in the target STI based on the dynamic determination as to whether or not resource sharing is to be used in the target STI.

The WAD 120 may be configured to dynamically control use of resource sharing by setting a resource sharing indicator (e.g., a flag or any other suitable indicator). The resource sharing indicator may be used by the scheduler(s) 122 to activate (or apply) resource sharing (e.g., when the resource sharing indicator indicates that resource sharing is to be activated or applied) or deactivate (or prevent application of) resource sharing (e.g., when the resource sharing indicator indicates that resource sharing is not to be applied). For example, where the resource sharing indicator is a flag, the flag may be set to a first value to (e.g., ON, 1, or the like) to indicate that resource sharing is to be activated or applied and may be set to a second value (e.g., OFF, 0, or the like) to indicate that resource sharing is not to be activated or applied. It will be appreciated that other suitable flag values may be used, other suitable types of resource sharing indicators may be used, or the like.

The WAD 120 may be configured to dynamically determine whether or not resource sharing is to be used based on various criteria.

The WAD 120 may be configured to make the determination regarding application of resource sharing locally at the WAD 120 based on information available at the WAD 120. The WAD 120 may be configured to determine that resource sharing is not to be used (e.g., flag=OFF) based on a determination that no MWD 110-M is connected to the WAD 120. The WAD 120 may be configured to determine that resource sharing is not to be used (e.g., flag=OFF) based on a determination that the number of MWDs 110-M connected to WAD 120 satisfies a threshold associated with a total number of MWDs 110-M permitted to be connected to the WAD 120 (e.g., 0.5 of the total number of MWDs 110-M permitted to be connected to the WAD 120, 0.6 of the total number of MWDs 110-M permitted to be connected to the WAD 120, or the like). The WAD 120 may be configured to determine that resource sharing is not to be used (e.g., flag=OFF) based on a determination that the number of MWDs 110-M on a transmission waiting list for the WAD 120 satisfies a threshold (e.g., a fixed value which may be determined per WAD based on the WAD architecture design). The WAD 120 may be configured to determine that resource sharing is to be used (e.g., flag=ON) based on a determination that the number of LWDs 110-L on a transmission waiting list for the WAD 120 satisfies a threshold (e.g., a fixed value which may be determined per WAD based on the WAD architecture design). The WAD 120 may be configured to determine that resource sharing is to be used (e.g., flag=ON) based on a determination that the data volume of transmissions by MWDs 110-M associated with the WAD 120 satisfies a threshold (e.g., is equal to or less than the threshold). It will be appreciated that various combinations of such criteria may be used, other criteria may be used, or the like, as well as various combinations thereof.

The WAD 120 may be configured to make the determination regarding application of resource sharing based on a resource sharing instruction that is received by WAD 120. For example, a device in the core wireless network supporting the WAD 120 may determine whether or not resource sharing is to be applied at WAD 120 and may send an indication of the determination to the WAD 120. For example, in the case of an LTE network, the MME may receive a resource sharing instruction from the PCRF and pass the resource sharing instruction to the WAD 120. The determination as to whether or not resource sharing is to be applied at the WAD 120 may be made by a device within the core network based on various types of information available to the device within the core network (at least some of which may not be available to the WAD 120). For example, such information which may be used by the device of the core network to determine whether or not resource sharing is to be applied at the WAD 120 may include traffic pattern information, network congestion information, or the like, as well as various combinations thereof.

The WAD 120 may be configured to dynamically activate and deactivate use of resource sharing based on the resource sharing indicator maintained at the WAD 120. When the resource sharing indicator for a target STI is set in a manner indicating that resource sharing is active for the target STI (and, thus, is to be applied in the target STI), the scheduler(s) 122 apply resource sharing within the target STI such that the MTC traffic and legacy traffic may share physical wireless resources within the target STI. When the resource sharing indicator for a target STI is set in a manner indicating that resource sharing is deactivated for the target STI (and, thus, is not to be applied in the target STI), the scheduler(s) 122 do not apply resource sharing within the target STI (the target STI supports only MTC traffic or only legacy traffic). It will be appreciated that, when the resource sharing indicator at the WAD 120 is set in a manner indicating that resource sharing is deactivated over multiple STIs (e.g., for a particular STW composed of multiple STIs, for multiple STWs each composed of a single STI, or the like), the MTC traffic and legacy traffic will be separated into different STIs (i.e., only MTC traffic or only legacy traffic in any given STI) until resource sharing is activated at the WAD 120.

It will be appreciated that the WAD 120 (and, more specifically, the wireless interface 121 and the scheduler(s) 122 of WAD 120) may be configured to support various other functions in order to support dynamic sharing of physical wireless resources between MTC traffic of MWDs 110-M and legacy traffic of LWDs 110-L.

FIG. 2 depicts an exemplary resource sharing bitmap representing sharing of physical wireless resources of a wireless interface between MTC traffic and legacy traffic.

The resource sharing bitmap 200 is a time domain resource sharing bitmap that represents sharing of physical wireless resources of a wireless interface between MTC traffic and legacy traffic in the time domain. The resource sharing bitmap 200 is determined for a target STW that includes four STIs. The resource sharing bitmap 200 represents sharing of physical wireless resources of a wireless interface between MTC traffic and legacy traffic in each of the four STIs of the target STW.

The resource sharing bitmap 200 includes a set of bit positions (or locations) which represent the time-based physical wireless resources of a wireless interface to be shared in each of the four STIs of the target STW. The set of bit positions is organized into multiple subsets of bit positions (each of which may include one or more bit positions) which represent portions of the time-based physical wireless resources of a wireless interface to be shared in each of the four STIs of the target STW, respectively.

The resource sharing bitmap 200 is primarily presented with respect to an embodiment in which the resource sharing bitmap 200 is for a 4G LTE network (and, thus, in which the STI is an LTE TTI); however, it will be appreciated that resource sharing bitmap 200 may be adapted to represents sharing of physical wireless resources of a wireless interface between MTC traffic and legacy traffic for various other types of wireless networks.

The bit position 0 (which is indicated as being associated with the DL) is related to the System Information Block (SIB), where setting of this bit position to a "0" indicates that there is not an SIB in the target STW and setting of this bit position to a "1" indicates that there is an SIB in the target STW.

The bit positions 1-4 (which are indicated as being associated with the DL) are related to SIB on the System Information-Physical Downlink Shared Channel (S-PDSCH), where setting of a bit position $n\_s$="0" indicates that TTI n does not have SIB on S-PDSCH and setting of a bit position $n\_s$="1" indicates that TTI n does have SIB on S-PDSCH.

The bit position 5 (which is indicated as being associated with the DL) is related to paging, where setting of this bit position to a "0" indicates that there is no paging in the target STW and setting of this bit position to a "1" indicates that there is paging in the target STW (e.g., on sub-frame #9 in the TTI on the Paging-Physical Downlink Control Channel (P-PDCCH) and sub-frame # x on P-PDSCH depending on the cell level MTC configuration.

The bit position 6 (which is indicated as being associated with the DL) is related to Random Access Response (RAR), where setting of this bit position to a "0" indicates that there is no RAR in the target STW and setting of this bit position to a "1" indicates that there is RAR in the target STW (e.g., on TTI # a to b on the Machine-PDDCH (M-PDDCH) and sub-frame # a to d on M-PDSCH depending on the system configuration.

The bit positions 7-14 (which are indicated as being associated with the DL) are related to M-PDCCH, where setting of a bit position $n\_c$="0" indicates that there is no M-PDCCH and setting of a bit position $n\_c$="1" indicates that the TTI mod 8=$n\_c$ has M-PDCCH.

The bit positions 15-22 (which are indicated as being associated with the DL) are related to M-PDSCH, where setting of a bit position $n\_d$="0" indicates that there is no M-PDSCH and setting of a bit position $n\_d$="1" indicates that the TTI mod 8=$n\_d$ has M-PDSCH.

The bit positions 23-30 (which are indicated as being associated with the UL) are related to the Physical Uplink Control Channel (M-PUSCH), where setting of a bit position $n\_u$="0" indicates that there is no M-PUSCH and setting of a bit position $n\_u$="1" indicates that the TTI mod 8=$n\_u$ has M-PUSCH. It is noted that this may include msg3, which may be useful in the event that msg3 supports Hybrid Automatic Repeat Request (HARQ).

It will be appreciated that resource sharing bitmap 200 is merely exemplary and that sharing of time-based physical wireless resources of a wireless interface may be represented using resource sharing bitmaps which may be defined in other ways (e.g., using a different organization of the bit positions with respect to each other, using fewer or more bit positions, using different types of bit positions, using different bit position settings, using different bit position settings to represent different types of resource sharing, or the like, as well as various combinations thereof).

It will be appreciated that resource sharing bitmap 200 is merely exemplary for time-based physical wireless resources of a wireless interface and that the resource sharing bitmap 200 may be adapted to represent frequency-based sharing of the physical wireless resources of a wireless interface (e.g., using bit positions representing frequency carriers, frequency sub-carriers, or the like), time and frequency sharing of the physical wireless resources of a wireless interface (e.g., using bit positions representing PRBs or other units of combined time and frequency resources), or the like.

FIG. 3 depicts an exemplary message flow between an MTC scheduler and a legacy scheduler for determining an agreed resource sharing.

As depicted in FIG. 3, the exemplary message flow 300 is between an MTC scheduler 310 and a legacy scheduler 320. The exemplary message flow 300 is shown within the context of a set of STWs (which are denoted as STW x and STW x+1), with time proceeding in a direction from the top of the page toward the bottom of the page. These STWs are the time windows within which the MTC scheduler 310 and the legacy scheduler 320 may schedule transmissions.

As further depicted in FIG. 3, within the STW x, the MTC scheduler 310 and the legacy scheduler 320 cooperate to determine a resource sharing for sharing of the physical wireless resources of the STW x+1. The MTC scheduler 310 sends a resource sharing request (denoted as resource sharing request x+1) to legacy scheduler 320. The resource sharing request is a request by MTC scheduler 310 for physical wireless resources within the STW x+1. The resource sharing request may include a requested resource sharing bitmap (e.g., such as the resource sharing bitmap 200 of FIG. 2) or other suitable indication of the physical wireless resources requested by the MTC scheduler within the STW x+1. The legacy scheduler 320 receives the resource sharing request, processes the resource sharing request, and sends a resource sharing response (denoted as resource sharing response x+1) to MTC scheduler 310. The legacy scheduler 320 may process the resource sharing request by determining whether to accept or reject the resource sharing request in its original form, determining whether to accept a modified version of the resource sharing request, or the like). The resource sharing response is indicative of the agreed resource sharing, agreed to by legacy scheduler 320, for use by the MTC scheduler 310 and the legacy scheduler 320 for sharing physical wireless resources within the STW x+1. The resource sharing response may include an indicator as to whether the resource sharing request is accepted or rejected, a resource sharing bitmap such as the original version of the resource sharing bitmap received in the resource sharing request or a modified version of the resource sharing bitmap received in the resource sharing request (e.g., a resource sharing bitmap such as the resource sharing bitmap 200 of FIG. 2), or other suitable indication of the agreed resource sharing for STW x+1.

As further depicted in FIG. 3, within the STW x, the MTC scheduler 310 and the legacy scheduler 320 each perform scheduling of communications on the physical wireless resources of the STW x+1 based on the agreed resource sharing determined for sharing of the physical wireless resources of STW x+1 to handle both MTC traffic and legacy traffic. The scheduling of traffic on the physical wireless resources of the STW x+1 based on the agreed resource sharing may include assigning portions of the physical wireless resources of the STW x+1 for use by specific devices (e.g., scheduling use of portions of the physical wireless resources of the STW x+1 that are allocated for MTC traffic by one or more MTC devices, scheduling use of portions of the physical wireless resources of the STW x+1 that are allocated for legacy traffic by one or more legacy devices, or combinations thereof). The scheduling of traffic on the physical wireless resources of the STW x+1 based on the agreed resource sharing may include informing wireless devices of respective portions of the physical wireless resources of STW x+1 assigned to those wireless devices, respectively. The scheduling of traffic on the physical wireless resources of the STW x+1 based on the agreed resource sharing may include scheduling traffic on the DL using DL resources of the STW x+1 and scheduling traffic on the UL using UL resources of the STW x+1.

As further depicted in FIG. 3, within the STW x+1, the MTC scheduler 310 and the legacy scheduler 320 apply the agreed resource sharing, determined in STW x, for sharing of the physical wireless resources of STW x+1 to handle both MTC traffic and legacy traffic. More specifically, the MTC scheduler 310 and the legacy scheduler 320 apply the agreed resource sharing within the STW x+1, based on the agreed resource sharing determined in STW x, by supporting communication of traffic within the STW x+1 based on the scheduling of communication of traffic within the STW x+1 which is based on the agreed resource sharing. More specifically, the MTC scheduler 310 controls communication of MTC traffic (e.g., DL MTC traffic and/or UL MTC traffic) within the STW x+1 based on the agreed resource sharing determined in STW x and, similarly, the legacy scheduler 320 controls communication of legacy traffic (e.g., DL legacy traffic and/or UL legacy traffic) within the STW x+1 based on the agreed resource sharing determined in STW x.

It will be appreciated that, although presented with respect to specific embodiments of determining resource sharing based on communication between an MTC scheduler and a legacy scheduler (e.g., determining agreed resource sharing for a target STW based on messages exchanged during an immediately preceding STW, determining agreed resource sharing based on a single exchange of messages, or the like), the determination of resource sharing based on communication between an MTC scheduler and a legacy scheduler may be performed in various other ways (e.g., determining agreed resource sharing for a target STW based on messages exchanged two or more STWs prior to the target STW, determining agreed resource sharing based on a negotiation using multiple exchanges of messages, or the like).

Figure 4:
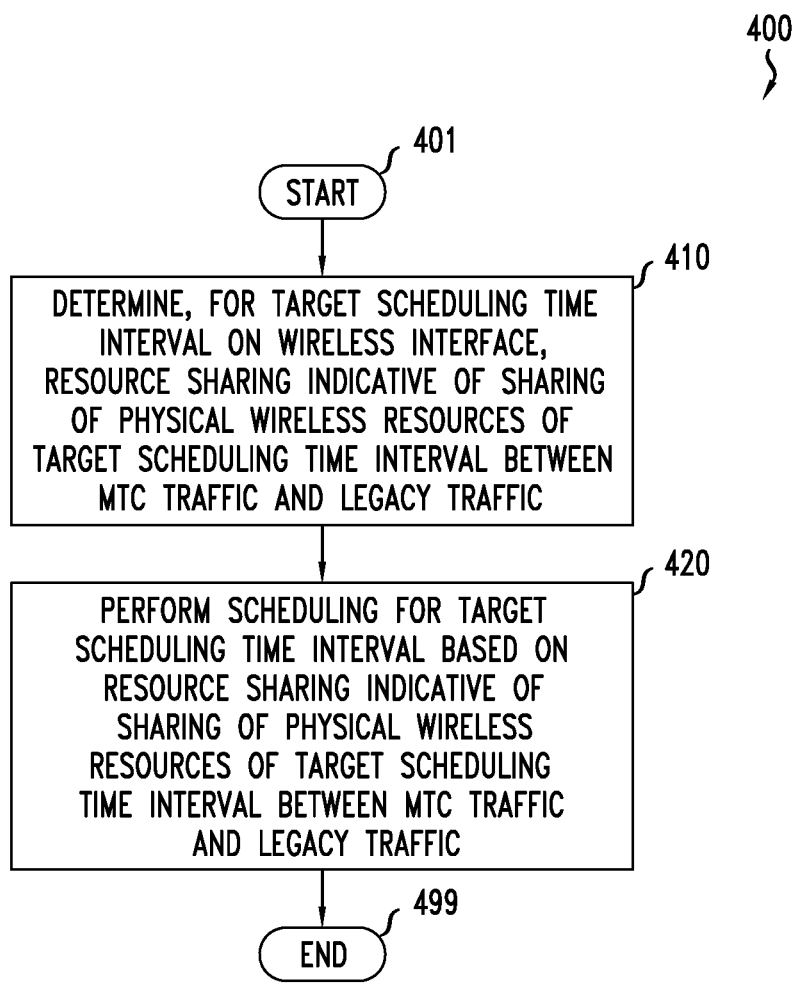
FIG. 4 depicts an exemplary embodiment of a method for supporting sharing of physical wireless resources of a wireless interface between MTC traffic and legacy traffic.

FIG. 4 depicts an exemplary embodiment of a method for supporting sharing of physical wireless resources of a wireless interface between MTC traffic and legacy traffic. The method 400 of FIG. 4 may be performed by a scheduler(s) of a wireless access device. It will be appreciated that, although primarily presented herein as being performed serially, at least a portion of the functions of method 400 may be performed contemporaneously or may be performed in a different order than as presented in method 400.

At block 401, method 400 begins.

At block 410, determine, for a target scheduling time interval on a wireless interface, a resource sharing indicative of sharing of physical wireless resources of the target scheduling time interval between MTC traffic and legacy traffic. The resource sharing indicative of sharing of physical wireless resources of the target scheduling time interval between MTC and legacy traffic may be determined and represented as presented herein with respect to FIGS. 1-3. The resource sharing also may be referred to herein as a resource sharing agreement or a resource sharing plan.

At block 420, perform scheduling for the target scheduling time interval based on the resource sharing indicative of sharing of physical wireless resources of the target scheduling time interval between MTC traffic and legacy traffic. The scheduling for the target scheduling time interval may include scheduling communications via the wireless interface. The scheduling of communications via the wireless interface may include assigning portions of the physical wireless resources of the target scheduling time interval for use by specific devices (e.g., scheduling use of portions of the physical wireless resources of the target scheduling time interval that are allocated for MTC traffic by one or more MTC devices, scheduling use of portions of the physical wireless resources of the target scheduling time interval that are allocated for legacy traffic by one or more legacy devices, or combinations thereof). The scheduling for the target scheduling time interval may include informing wireless devices of respective portions of the physical wireless resources of the target scheduling time interval assigned to those wireless devices, respectively. The scheduling for the target scheduling time interval may include scheduling transmission of traffic on the DL, using DL resources of the target scheduling time interval, based on the resource sharing indicative of sharing of physical wireless resources of the target scheduling time interval between MTC traffic and legacy traffic. The scheduling for the target scheduling time interval may include scheduling reception of traffic on the UL, using UL resources of the target scheduling time interval, based on the resource sharing indicative of sharing of physical wireless resources of the target scheduling time interval between MTC traffic and legacy traffic. The scheduling for the target scheduling time interval, based on the resource sharing indicative of sharing of physical wireless resources of the target scheduling time interval between MTC traffic and legacy traffic, may include various other traffic scheduling functions which may be performed by a scheduler(s) of a wireless access device.

At block 499, method 400 ends.

It will be appreciated that, although primarily presented herein with respect to functions performed by a wireless access device for supporting sharing of physical wireless resources of a wireless interface of the wireless access device between MTC traffic of the MTC wireless devices and legacy traffic of legacy wireless devices, a wireless device (e.g., an MTC wireless device or a legacy wireless device) may be configured to perform functions supporting or related to sharing of physical wireless resources of a wireless interface between MTC traffic of the MTC wireless devices and legacy traffic of legacy wireless devices. For example, a wireless device may be configured to provide information (e.g., control channel signaling or the like) to the wireless access device which may be used by the wireless access device to determine sharing of physical wireless resources of the wireless interface of the wireless access device between MTC traffic of the MTC wireless devices and legacy traffic of legacy wireless devices. For example, a wireless device may be configured to (1) receive, from the wireless access device for a target STI, an indication of portions of the physical wireless resources of the wireless interface of the wireless access device allocated to the wireless device during the target STI (which also may be indicative of the sharing of the physical wireless resources of the wireless interface of the wireless access device between MTC traffic of the MTC wireless devices and legacy traffic of legacy wireless devices during the target STI) and (2) communicate via the wireless interface of the wireless access device (e.g., receive DL traffic and/or transmit UL traffic) during the target STI based on the indication of portions of the physical wireless resources of the wireless interface of the wireless access device allocated to the wireless device during the target STI. The wireless devices may be configured to provide various other functions supporting or related to sharing of physical wireless resources of a wireless interface between MTC traffic of the MTC wireless devices and legacy traffic of legacy wireless devices.

It will be appreciated that, although primarily presented herein within the context of specific embodiments (e.g., supporting sharing of physical wireless resources of a wireless interface between MTC traffic and legacy traffic that are provided within a specific type of wireless system), various other embodiments are contemplated. For example, it will be appreciated that, although primarily presented herein within the context of supporting sharing of physical wireless resources of a wireless interface between MTC traffic and legacy traffic that are provided within a specific type of wireless system (namely, an LTE wireless system), sharing of physical wireless resources of a wireless interface between MTC traffic and legacy traffic may be provided in various other types of wireless systems (e.g., a 5G cellular wireless system, a satellite-based wireless system, a short-range wireless system (e.g., WiFi), or the like. For example, it will be appreciated that, although primarily presented herein within the context of supporting sharing of physical wireless resources of a wireless interface between particular types of traffic (namely, MTC traffic and non-MTC, or legacy, traffic), sharing of physical wireless resources of a wireless interface may be provided for sharing various other types of traffic in these or various other types of wireless systems. For example, it will be appreciated that, although primarily presented herein within the context of supporting sharing of physical wireless resources of a single wireless interface, sharing of physical wireless resources may be provided across multiple wireless interfaces sharing radio spectrum. For example, it will be appreciated that, although primarily presented herein within the context of using a particular type of interaction between radio frequency schedulers, other types of interaction between radio frequency schedulers may be used. It is noted that various combinations of such embodiments are contemplated.

Figure 5:
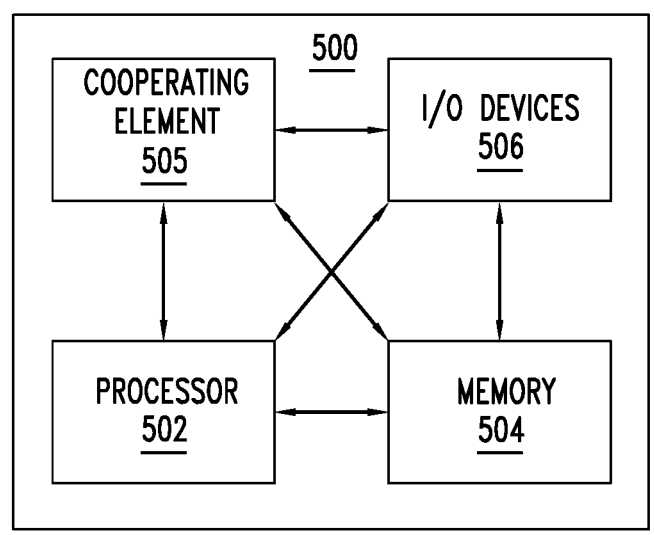
FIG. 5 depicts a high-level block diagram of a computer suitable for use in performing various functions described herein.

FIG. 5 depicts a high-level block diagram of a computer suitable for use in performing various functions described herein.

The computer 500 includes a processor 502 (e.g., a central processing unit (CPU), a processor having a set of processor cores, a processor core of a processor, or the like) and a memory 504 (e.g., a random access memory (RAM), a read only memory (ROM), or the like). The processor 502 and the memory 504 are communicatively connected. The memory 504 may store instructions which, when executed by processor 502, cause the processor 502 to provide various functions presented herein. The memory 504 may store information or data which may be used, during execution of instructions by the processor 502, to provide various functions presented herein.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a non-transitory computer-readable storage medium, such as a storage device or other storage element (e.g., a magnetic drive, an optical drive, or the like)).

The computer 500 also may include one or more input/output devices 806. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 (or portions thereof) may provide a general architecture and functionality that is suitable for implementing one or more of a WD 110, WAD 120, wireless interface 121, scheduler(s) 122, network interface 129, a device of CN 130, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      determine, for a target scheduling time interval on a wireless interface based on interaction between a machine-type communication (MTC) traffic scheduler configured to schedule transmission of MTC traffic over the wireless interface and a legacy traffic scheduler configured to schedule transmission of legacy traffic over the wireless interface, a resource sharing indicative of sharing of physical wireless resources of the target scheduling time interval between MTC traffic and legacy traffic, wherein the interaction includes communication of at least one message between the MTC traffic scheduler and the legacy traffic scheduler; and
      perform scheduling for the target scheduling time interval based on the resource sharing indicative of sharing of the physical wireless resources of the target scheduling time interval between MTC traffic and legacy traffic.

2. The apparatus of claim 1, wherein the resource sharing is determined based on at least one of MTC information and legacy information.

3. The apparatus of claim 1, wherein the resource sharing is determined based on at least one of measurement of resource utilization of the physical wireless resources of the wireless interface, MTC traffic overhead information, MTC traffic signaling information, MTC traffic utilization report information, MTC transmission waiting list information, a determination as to whether at least one MTC transmission is scheduled for the target scheduling time interval, a determination as to whether a page is to be sent in the target scheduling time interval, a determination as to whether a Random Access Channel (RACH) is to be responded to in the target scheduling time interval, or traffic activity information associated with at least one previous scheduling time interval.

4. The apparatus of claim 1, wherein the resource sharing is determined based on at least one of an indication of a traffic mix for legacy traffic or quality-of-service (QoS) information for legacy traffic.

5. The apparatus of claim 1, wherein the at least one memory and the computer program code are configured to, with the at least one processor, cause the apparatus to at least:
represent the resource sharing using a resource sharing bitmap comprising a set of bit positions associated with the physical wireless resources of the target scheduling time interval.

6. The apparatus of claim 1, wherein, to determine the resource sharing, the at least one memory and the computer program code are configured to, with the at least one processor, cause the apparatus to at least:
determine, by the MTC scheduler, a proposed resource sharing comprising a request by the MTC scheduler for at least a portion of the physical wireless resources of the target scheduling time interval;
propagate, from the MTC scheduler toward the legacy scheduler, a resource sharing request including the proposed resource sharing; and
receive, by the MTC scheduler from the legacy scheduler, a resource sharing response indicative of the resource sharing.

7. The apparatus of claim 6, wherein the proposed resource sharing is represented as a proposed resource sharing bitmap.

8. The apparatus of claim 7, wherein the resource sharing response includes an indicator indicative that the proposed resource sharing bitmap is granted by the legacy scheduler.

9. The apparatus of claim 7, wherein the resource sharing response includes an agreed resource sharing bitmap.

10. The apparatus of claim 9, wherein the agreed resource sharing bitmap is identical to the proposed resource sharing bitmap.

11. The apparatus of claim 9, wherein the agreed resource sharing bitmap is different than the proposed resource sharing bitmap.

12. The apparatus of claim 1, wherein, to determine the resource sharing, the at least one memory and the computer program code are configured to, with the at least one processor, cause the apparatus to at least:
receive, by the legacy scheduler from the MTC scheduler, a resource sharing request including a proposed resource sharing of the MTC scheduler; and
determine, by the legacy scheduler based on the proposed resource sharing, the resource sharing.

13. The apparatus of claim 12, wherein, to determine the resource sharing based on the proposed resource sharing, the at least one memory and the computer program code are configured to, with the at least one processor, cause the apparatus to at least:
determine, by the legacy scheduler, whether to grant or deny the proposed resource sharing.

14. The apparatus of claim 13, wherein the at least one memory and the computer program code are configured to, with the at least one processor, cause the apparatus to at least:
propagate, from the legacy scheduler toward the MTC scheduler based on a determination to grant the proposed resource sharing, a resource sharing response indicative of the determination to grant the proposed resource sharing.

15. The apparatus of claim 14, wherein the proposed resource sharing is represented as a proposed resource sharing bitmap, wherein the resource sharing response includes the proposed resource sharing bitmap.

16. The apparatus of claim 13, wherein the at least one memory and the computer program code are configured to, with the at least one processor, cause the apparatus to at least:
propagate, from the legacy scheduler toward the MTC scheduler based on a determination to deny the proposed resource sharing, a resource sharing response indicative of the determination to deny the proposed resource sharing.

17. The apparatus of claim 12, wherein, to determine the resource sharing based on the proposed resource sharing, at least one memory and the computer program code are configured to, with the at least one processor, cause the apparatus to at least:
determine, by the legacy scheduler, whether to grant a modified version of the proposed resource sharing; and
propagate, from the legacy scheduler toward the MTC scheduler based on a determination to grant the modified version of the proposed resource sharing, a resource sharing response indicative of the determination to grant the modified version of the proposed resource sharing.

18. The apparatus of claim 1, wherein the at least one memory and the computer program code are configured to, with the at least one processor, cause the apparatus to at least:
determine, for a next target scheduling time interval on the wireless interface, that use of resource sharing is activated for the next target scheduling time interval.

19. The apparatus of claim 18, wherein a determination that use of resource sharing is activated for the next target scheduling time interval is based on at least one of a determination that a number of legacy devices on a transmission waiting list satisfies a threshold or a determination that a volume of transmissions by MTC devices satisfies a threshold.

20. The apparatus of claim 1, wherein the at least one memory and the computer program code are configured to, with the at least one processor, cause the apparatus to at least:
determine, for a next target scheduling time interval on the wireless interface, that use of resource sharing is deactivated for the next target scheduling time interval.

21. The apparatus of claim 20, wherein a determination that use of resource sharing is deactivated for the next target scheduling time interval is based on at least one of a determination that no MTC devices are connected, a determination that a number of MTC devices connected satisfies a threshold associated with a total number of MTC devices permitted to be connected, or a determination that a number of MTC devices on a transmission waiting list satisfies a threshold.

22. A non-transitory computer-readable storage medium storing instructions configured to cause an apparatus to at least:
 determine, for a target scheduling time interval on a wireless interface based on interaction between a machine-type communication (MTC) traffic scheduler configured to schedule transmission of MTC traffic over the wireless interface and a legacy traffic scheduler configured to schedule transmission of legacy traffic over the wireless interface, a resource sharing indicative of sharing of physical wireless resources of the target scheduling time interval between MTC traffic and legacy traffic, wherein the interaction includes communication of at least one message between the MTC traffic scheduler and the legacy traffic scheduler; and
 perform scheduling for the target scheduling time interval based on the resource sharing indicative of sharing of the physical wireless resources of the target scheduling time interval between MTC traffic and legacy traffic.

23. A method, comprising:
 determining, for a target scheduling time interval on a wireless interface based on interaction between a machine-type communication (MTC) traffic scheduler configured to schedule transmission of MTC traffic over the wireless interface and a legacy traffic scheduler configured to schedule transmission of legacy traffic over the wireless interface, a resource sharing indicative of sharing of physical wireless resources of the target scheduling time interval between MTC traffic and legacy traffic, wherein the interaction includes communication of at least one message between the MTC traffic scheduler and the legacy traffic scheduler; and
 performing scheduling for the target scheduling time interval based on the resource sharing indicative of sharing of the physical wireless resources of the target scheduling time interval between MTC traffic and legacy traffic.

24. The apparatus of claim 1, wherein, to determine the resource sharing, the at least one memory and the computer program code are configured to, with the at least one processor, cause the apparatus to at least:
 determine, by the MTC scheduler, a proposed resource sharing comprising a request by the MTC scheduler for at least a portion of the physical wireless resources of the target scheduling time interval; and
 propagate, from the MTC scheduler toward the legacy scheduler, a resource sharing request including the proposed resource sharing.

\* \* \* \* \*